(12) United States Patent
Ito (10) Patent No.: US 7,599,522 B2
(45) Date of Patent: Oct. 6, 2009

(54) INFORMATION ACCESS METHOD USING BIOMETRICS AUTHENTICATION AND INFORMATION PROCESSING SYSTEM USING BIOMETRICS AUTHENTICATION

(75) Inventor: Kimikazu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 11/312,551

(22) Filed: Dec. 21, 2005

(65) Prior Publication Data

US 2007/0041620 A1 Feb. 22, 2007

(30) Foreign Application Priority Data

Aug. 19, 2005 (JP) ............... 2005-238770

(51) Int. Cl.
G06K 9/00 (2006.01)
(52) U.S. Cl. ............... 382/115; 340/5.52; 340/5.8; 382/305; 705/67; 713/186
(58) Field of Classification Search ............... 340/5.83, 340/5.52, 5.8; 382/115, 117, 124, 305; 705/64, 705/67; 707/6, 102, 104.1; 713/186
See application file for complete search history.

(56) References Cited

U.S. PATENT DOCUMENTS

| | | | | |
|---|---|---|---|---|
| 5,210,797 A * | 5/1993 | Usui et al. | ............... | 382/126 |
| 6,018,739 A * | 1/2000 | McCoy et al. | ............... | 707/102 |
| 6,662,166 B2 * | 12/2003 | Pare et al. | ............... | 705/39 |
| 6,929,413 B2 * | 8/2005 | Schofield | ............... | 400/103 |
| 7,359,534 B2 * | 4/2008 | Semba et al. | ............... | 382/124 |
| 7,415,138 B2 * | 8/2008 | Schneider et al. | ............... | 382/115 |
| 7,512,567 B2 * | 3/2009 | Bemmel et al. | ............... | 705/67 |
| 2003/0166994 A1 | 9/2003 | Ooshima et al. | | |
| 2006/0098847 A1 * | 5/2006 | Takahashi | ............... | 382/115 |
| 2006/0222211 A1 * | 10/2006 | Olivo et al. | ............... | 382/115 |
| 2006/0235729 A1 * | 10/2006 | Braithwaite et al. | ............... | 705/3 |
| 2007/0025598 A1 * | 2/2007 | Kobayashi et al. | ............... | 382/117 |
| 2007/0041620 A1 * | 2/2007 | Ito | ............... | 382/115 |
| 2007/0260887 A1 * | 11/2007 | Ito | ............... | 713/186 |
| 2008/0002861 A1 * | 1/2008 | Yano et al. | ............... | 382/115 |

(Continued)

FOREIGN PATENT DOCUMENTS

JP 2000-293643 10/2000

(Continued)

OTHER PUBLICATIONS

U.S. Appl. No. 11/086,917, filed Mar. 23, 2005, Igarashi.

*Primary Examiner*—Gregory M Desire
(74) *Attorney, Agent, or Firm*—Westerman, Hattori, Daniels & Adrian, LLP.

(57) ABSTRACT

An information processing system using biometrics authentication employ biometrics characteristics for individual authentication to enable accessing of individual information, with which the convenience of input for users is improved. A biometrics database which links and stores group numbers, individual identification numbers, and biometrics data is provided, and a group number is used to read biometrics data for the group, which is verified against detected biometrics data to identify the individual identification number and access an individual database. Even if a user sets a group number which is not easily forgotten, biometrics authentication can be used to execute individual authentication with high accuracy, and moreover secure individual information access is possible.

10 Claims, 8 Drawing Sheets

U.S. PATENT DOCUMENTS

2008/0065901 A1* 3/2008 Takaku et al. .............. 713/186

FOREIGN PATENT DOCUMENTS

| | | | |
|---|---|---|---|
| JP | 2000-347995 A | 12/2000 |
| JP | 2001-325549 A | 11/2001 |
| JP | 2002-062222 | 8/2002 |
| JP | 2004-374080 | 12/2004 |

* cited by examiner

INFORMATION ACCESS METHOD USING BIOMETRICS AUTHENTICATION AND INFORMATION PROCESSING SYSTEM USING BIOMETRICS AUTHENTICATION

CROSS-REFERENCE TO RELATED APPLICATIONS

This application is based upon and claims the benefit of priority from the prior Japanese Patent Application No. 2005-238770, filed on Aug. 19, 2005, the entire contents of which are incorporated herein by reference.

BACKGROUND OF THE INVENTION

1. Field of the Invention

This invention relates to an information access method which uses biometrics characteristics of a portion of a human body for individual authentication to permit accessing of information, and a system therefor, and in particular relates to an information access method and information processing system for the same in which, through an easy input operation, registered biometrics information is verified against detected biometrics information, to permit accessing of information.

2. Description of the Related Art

From the standpoint of protection of individual information, in recent years permission to access individual information and other information has posed problems. For this reason there have been demands for more sophisticated individual authentication technology, and biometrics authentication technology in particular has attracted attention. There are numerous portions of the human body which can differentiate the individual, such as fingerprints and toe-prints, the retinas of the eyes, facial features, and blood vessels, so biometrics authentication recognizes such portions of a human body to perform individual authentication.

For example, blood vessels of the palms, the back and fingers of the hands provide a comparatively large quantity of individual characteristic data, and blood vessel (vein) patterns in particular remain unchanged throughout life from infancy and are regarded as being completely unique, and so are well-suited to individual authentication. In authentication technology based on blood vessel images in the palm of the hand, the user brings his hand into proximity with an image capture device during registration and during authentication. The image capture device emits near-infrared rays, which are incident on the palm of the hand. The image capture device uses a sensor to receive near-infrared rays rebounding from the palm of the hand.

Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

In order to use such blood vessel images in individual authentication, the user first uses an image capture device to register vein image data of the palm of his own hand in a server database. Then, in order to perform individual authentication, the user employs an image capture device to cause the vein image data of his own hand to be read. The registered vein image retrieved from the database using the ID of the user is verified against the vein pattern of the vein image for verification thus read, and based on the degree of similarity, the individual is authenticated (see Japanese Patent Laid-open No. 2000-293643).

Individual information access methods employing such biometrics authentication are widely used in medical systems, financial systems, and similar (see Japanese republished Patent 2002-062222).

In system which uses such biometrics authentication to permit information access, an individual's ID number must be input to extract registered biometrics information. From the standpoint of the user, the system would be more convenient if the individual could be identified solely through biometrics authentication, without requiring input of an ID number. This is called N:1 authentication. The larger the number of registrations N of biometrics authentication data, the more time is required for searching, making such a method unsuitable for a large-scale system.

Hence in the prior art, when performing biometrics authentication, biometrics data linked with a unique ID number is expanded into memory from a database, and by verifying the biometrics data against biometrics data acquired from a sensor for biometrics data, a biometrics authentication system with fast response has been constructed. This is called 1:1 authentication. However, in the case of 1:1 authentication, the ID numbers of users must each be unique, and in system with a large number of users the ID numbers have numerous digits, and are difficult to remember. Conversely, if the number of digits is made small to facilitate memorization, there is the possibility of overlapping of registrant numbers, and the possibility of N:1 authentication is increased.

In an example of a system requiring a small number N, such as a system to regulate entry into and egress from apartment rooms, biometrics authentication is performed after input of the room number. In this case, a plurality of persons are family members living in the same room, and so it is possible to provide a function enabling registration of a plurality of persons with a single ID number. However, because a unique number cannot be assigned to each registrant, biometrics authentication is possible, but it is difficult to access individual information or other information through this authentication. For example, if biometrics authentication is to be used in a rental system, it would be difficult to manage individual information such as the circumstances of rentals to each individual, the history of past rentals, and similar.

This problem has impeded the spread of biometrics authentication equipment and has been one reason for reduced efficiency for users; and further innovations to enable effective utilization of biometrics authentication in such environments has been deemed necessary.

SUMMARY OF THE INVENTION

Hence one object of the invention is to provide a biometrics authentication information access method and biometrics authentication information processing system which permit information access upon individual authentication through biometrics authentication, using a simple number, without the need for each user to remember an identification number.

A further object of the invention is to provide a biometrics authentication information access method and biometrics authentication information processing system which perform individual authentication through biometrics authentication to simplify input operations by users for information access permission, and to improve convenience to users.

Still a further object of the invention is to provide a biometrics authentication information access method and biometrics authentication information processing system which perform individual authentication through biometrics authentication, even when a user does not possess a card, to simplify input operations by users for information access permission, and to improve convenience to users.

In order to attain these objects, an information processing system of this invention, which performs biometrics authentication in which biometrics characteristics of a user are detected, individual authentication is performed, and accessing of information related to the authenticated individual is permitted, has a detection device, which detects the relevant portion of the biometrics characteristics; an input unit, which inputs a group number of the user; a biometrics database file, which stores the group number, an individual identification number belonging to the group of the group number, and biometrics characteristic data linked to the individual identification number; an individual database file, which stores individual information for the user linked to the individual identification number; and, a control unit, which uses the input group number to read the corresponding individual identification numbers and biometrics characteristic data from the biometrics database file, and performs processing to verify the biometrics characteristic data obtained from the biometrics characteristic portion detected by the detection device against the read-out biometrics characteristic data. The control unit executes access of the individual database file using the individual identification number linked to biometrics characteristic data for which the verification result is satisfactory.

Further, an information access method using biometrics authentication of this invention, in which biometrics authentication is performed by detecting biometrics characteristics of a user, performing individual authentication, and permitting the accessing of information related to the authenticated individual, has a step of detecting the relevant portion of the biometrics characteristics; a step of inputting the group number of the user; a step of using the input group number to read, from a biometrics database file storing the group number, individual identification numbers belonging to the group number, and the biometrics characteristic data linked to the individual identification numbers, the corresponding individual identification numbers and biometrics characteristic data; a step of verifying the biometrics characteristic data obtained from the detected biometrics characteristic portion against the read-out biometrics characteristic data; and, a step of using the individual identification number linked to the biometrics characteristic data for which the verification result is satisfactory to execute access of the individual database file storing individual information, linked to the individual identification number.

In this invention, it is preferable that the control unit have a terminal device connected to the detection device and to the input unit, and a server connected to the biometrics database file and to the individual database file, and that the terminal device and the server be connected.

In this invention, it is preferable that the control unit receives the group number input from the input unit, the individual identification number and the biometrics characteristic data detected by the detection device, and register the group number, the individual identification number, and the biometrics characteristic data in the biometrics database file.

In this invention, it is preferable that the terminal device transmit the input group number and the biometrics characteristic data detected by the detection device to the server, that the server read from the biometrics database file the corresponding individual identification numbers and biometrics characteristic data using the input group number, that verification processing against the biometrics characteristic data detected by the detection device be performed, that the individual identification number linked to the biometrics characteristic data for which the verification result is satisfactory be used to execute access of the individual database file, and that the accessed individual information be transmitted to the terminal device.

In this invention, it is preferable that the terminal device transmit the input group number to the server, and that the server use the input group number to read and transmit to the terminal device the corresponding individual identification numbers and the biometrics characteristic data from the biometrics database file, that the terminal device perform verification processing against the biometrics characteristic data detected by the detection device and notify the server of the verification result, and that the server use the individual identification number linked to the biometrics characteristic data for which there has been a satisfactory verification result to execute access of the individual database file and transmit the accessed individual information to the terminal device.

In this invention, it is preferable that the control unit use the input group number to perform processing to verify a plurality of biometrics characteristic data sets, read from the biometrics database file, against biometrics characteristic data obtained from the biometrics characteristic portion detected by the detection device, and identify the individual identification number belonging to the group.

In this invention, it is preferable that the control unit extract the biometrics characteristic data from the biometrics characteristic portion detected by the detection device.

In this invention, it is preferable that the detection device be a device which detects blood vessel images in the body.

In this invention, it is preferable that the detection device be an image capture unit which captures images of blood vessels in a hand of the body.

In this invention, it is preferable that the control unit use the accessed individual information and perform information processing.

According to this invention, a biometrics database is provided which links and stores a group number, an individual identification number, and biometrics data; the group number is used to read biometrics data for the group, which is verified against detected biometrics data to identify the individual identification number, so that even if the group number alone is input, the individual database can be accessed. Hence even if a user sets a group number which is not easily forgotten, highly accurate individual authentication can be executed through biometrics authentication, and safe accessing of individual information is possible, contributing to improved convenience for users.

DESCRIPTION OF THE PREFERRED EMBODIMENTS

Below, embodiments of the invention are explained in the order of an individual information processing system using biometrics authentication, biometrics authentication equipment, biometrics data registration processing, individual information access processing using biometrics data authentication, and other embodiments.

Individual Information Processing System Using Biometrics Authentication

Figure 1:
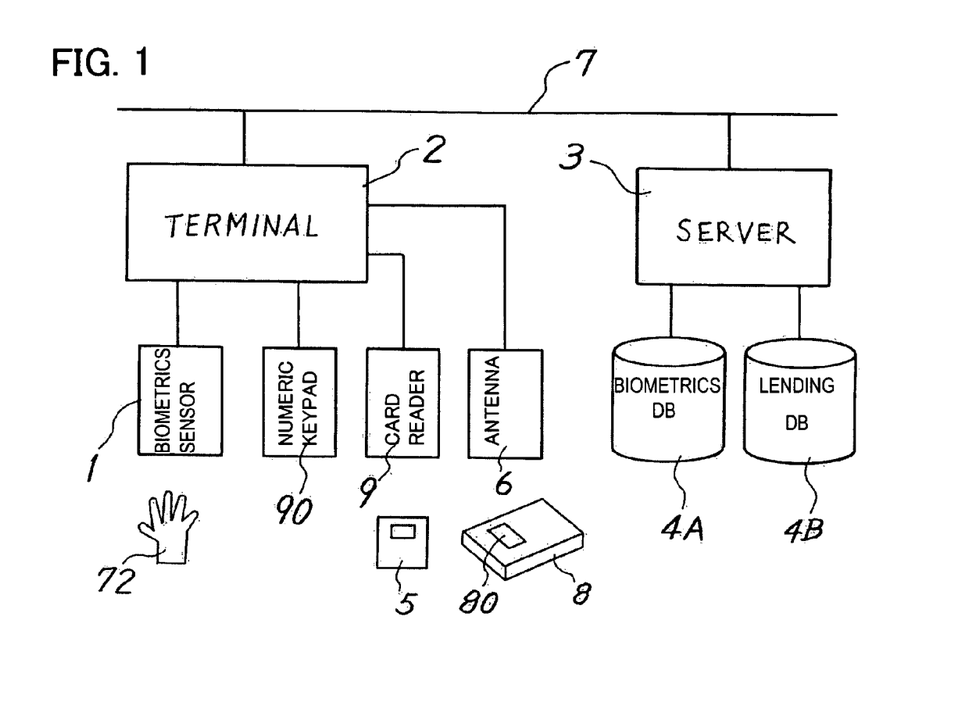
FIG. 1 shows the configuration of an information processing system of an embodiment of the invention.
Figure 2:
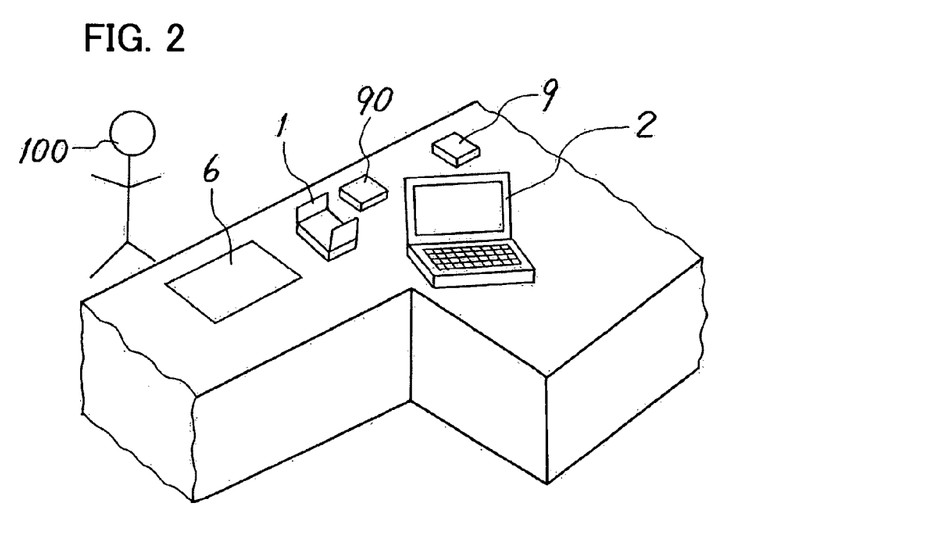
FIG. 2 shows the configuration of the service area equipment in FIG. 1.
Figure 3:
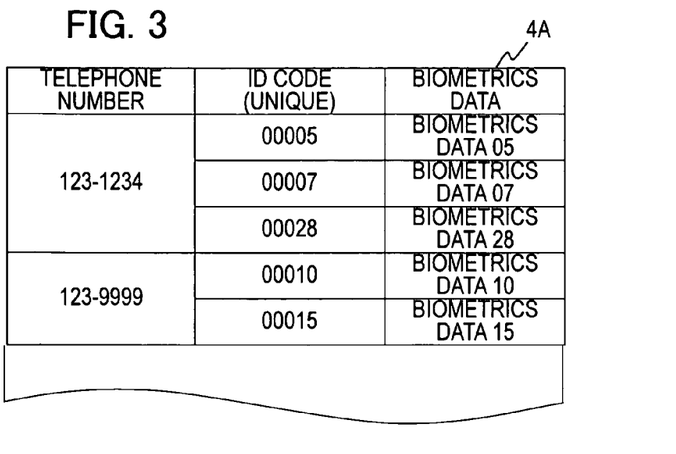
FIG. 3 explains the biometrics database of FIG. 1.

FIG. 1 shows the configuration of an individual information processing system using biometrics authentication in one embodiment of the invention; FIG. 2 shows the configuration of the service area in the system of FIG. 1; FIG. 3 explains the biometrics database of FIG. 1; and FIG. 4 explains the lending database of FIG. 1.

Figure 5:
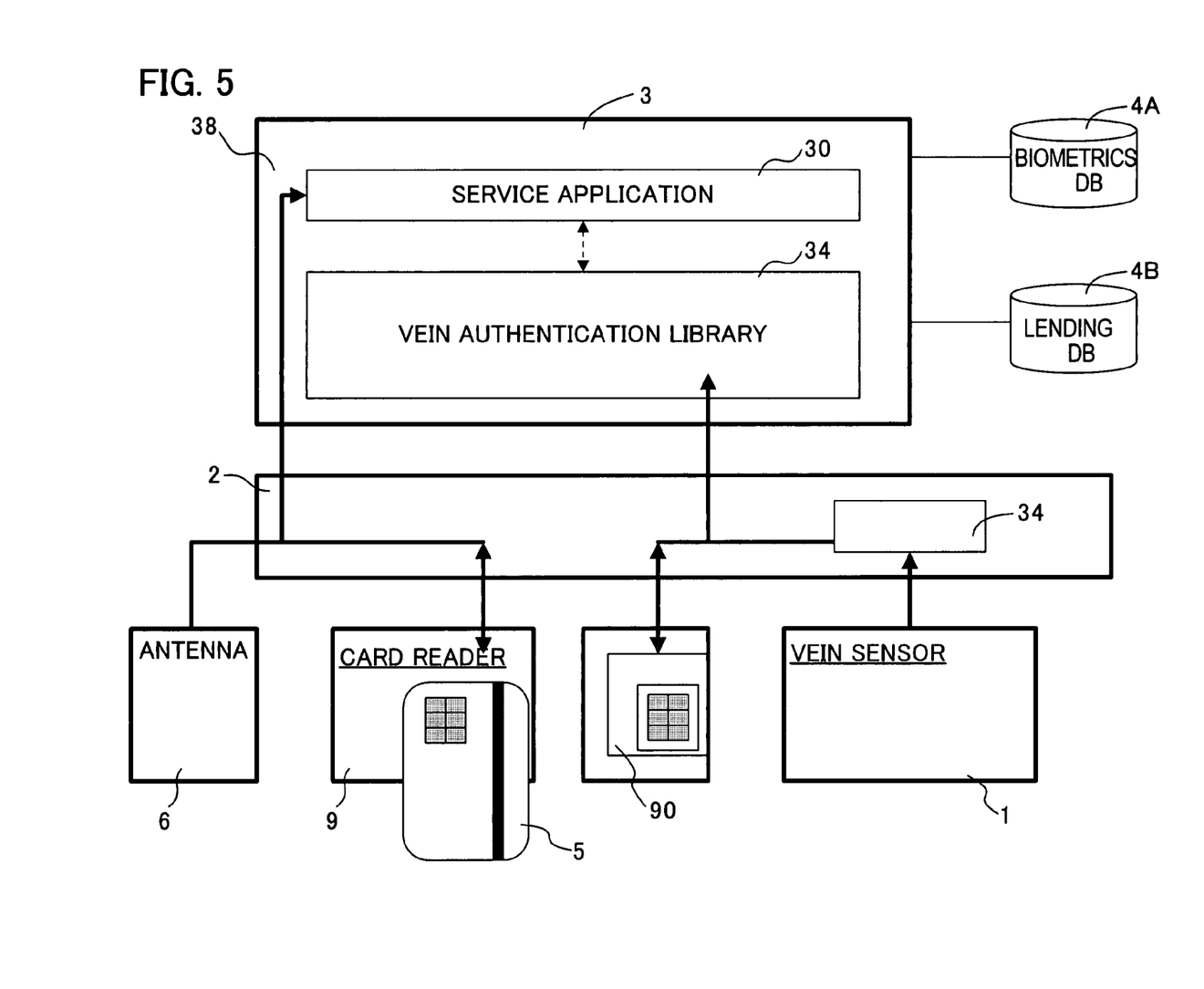
FIG. 5 is a detailed block diagram of the information processing system of FIG. 1.

FIG. 1 and FIG. 2 show an example of library lending system employing palm vein authentication equipment as the biometrics authentication equipment. As shown in FIG. 1 and FIG. 2, the palm image capture device 1, as shown in FIG. 5 below, numeric keypad 90, card reader 9, RF-ID antenna 6, and a service terminal (for example, a personal computer) 2 connected to these, are provided in the service area of the library.

The RF (Radio Frequency)-ID antenna 6 reads, by contact-free means, an IC (Integrated Circuit) tag 80 fastened to a book 8 owned by the library. The card reader 9 reads data on an individual card 5 issued to a user. The numeric keypad 90 is used by a user to input an easy-to-remember group number of the user, described below. The image capture device 1 reads a blood vessel image from the palm of a hand 72.

A user who has requested vein authentication extends his hand over the palm image capture device (hereafter "image capture device") 1. The image capture device 1 reads the palm, and through blood vessel image extraction processing (explained below using FIG. 8) by the terminal device 2, the vein pattern is extracted and is registered as vein data in the terminal device 2.

This vein data is recorded in a biometrics database file 4A of the database server 3 connected to the terminal device 2 via a network (LAN: Local Area Network). The server 3 further has a lending database file 4B, explained below.

As shown in FIG. 3, the biometrics database file 4A stores group number such as telephone number, a plurality of ID codes for a group, and biometrics data corresponding to each of the ID codes. If the group is for example a family, the group number may be the telephone number of the family's home, or the birth date of a specific member thereof, or another number easily remembered by the family members; the ID numbers are individual codes for each of the persons in the family.

Figure 4:
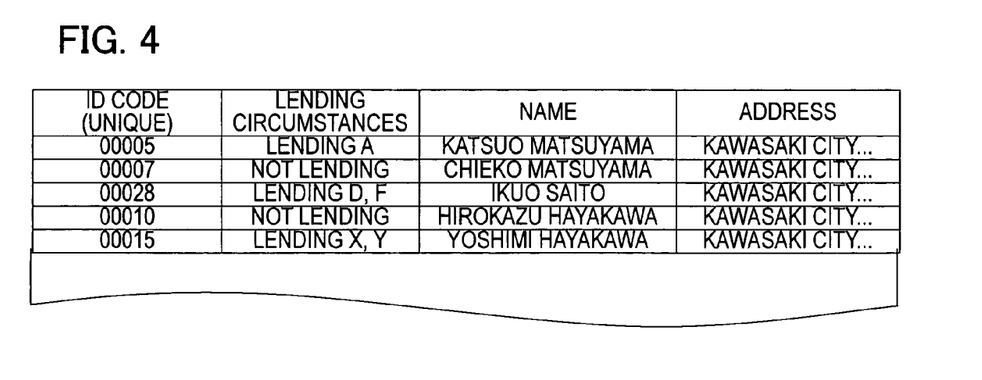
FIG. 4 explains the individual database of FIG. 1.

As shown in FIG. 4, the lending database file 4B stores individual data corresponding to each ID code. Here, the individual data includes lending circumstances, name, address, and similar.

In order for a user 100 to borrow a book at the service area, the user brings the book 8 to be borrowed to the service area. An IC tag 80 is affixed to this book 8. The IC tag 80 stores the management date, name, and other management data for the book, and the stored contents can be read wirelessly. The antenna 6 reads the stored contents of the IC tag 80 and transfers the contents to the terminal 2.

On the other hand, the user 100 uses the numeric keypad 90 to input the group number (in FIG. 3, a telephone number), and extends his hand over the image capture device 1 provided in the service area 7. The image capture device 1 reads the palm of the hand, and through blood vessel image extraction processing by the service area terminal device 2, the vein pattern is extracted. The service area terminal device 2 transmits the extracted blood vessel image data and the input group number to the server 3 over the network 7.

The server 3 reads the blood vessel image (vein) data registered for the group number from the biometrics database file 4A, and through verification processing verifies the transmitted vein data against the registered vein data to perform individual authentication.

If the individual authentication is satisfactory, the server 3 uses the biometrics database file 4A to search the lending database file 4B using the ID code for which the individual has been recognized through the biometrics database file 4A, retrieves the corresponding individual data, and transmits the data to the terminal 2. The terminal 2 displays the individual data on a display and an operator confirms the operation. Lending processing is performed through operation by the operator and using the book management data read by the antenna 6, and the server 3 is notified of the result, and the lending database file 4B is updated.

In this way, biometrics authentication can be used to confirm an individual even when using a number which is easily remembered by the user as the key to the biometrics data, and as a result of this confirmation of the individual, the individual number can be identified using the number, so that individual information can be accessed. Consequently even if a user forgets his own individual number, or when individual numbers have many digits, the individual can be identified, and so biometrics authentication can be employed to enable accessing of individual information for a wide range of age groups including the elderly and children.

Biometrics Authentication Equipment

Figure 6:
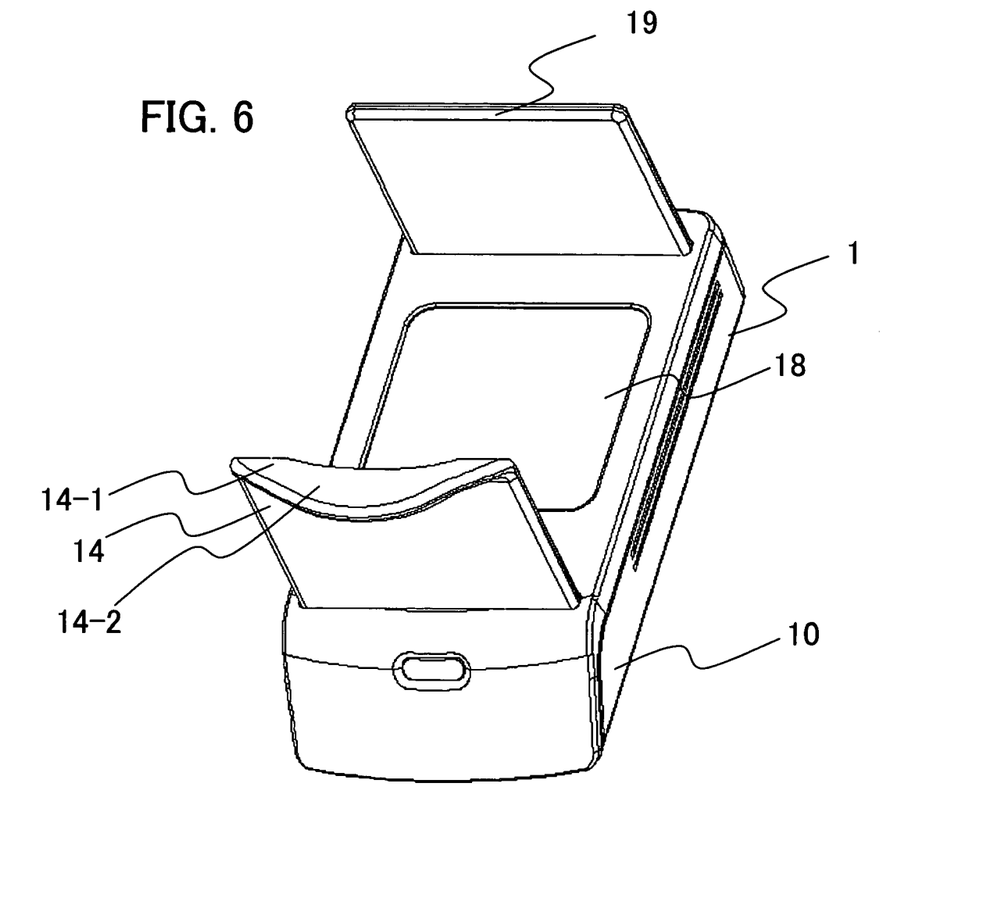
FIG. 6 is an external view of the blood vessel image detection device of FIG. 1.
Figure 7:
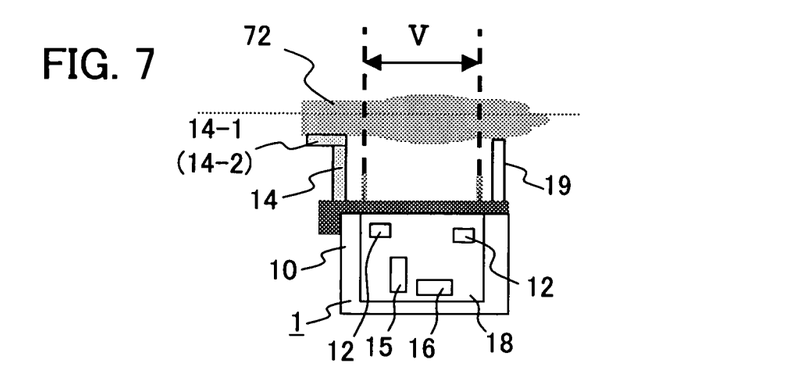
FIG. 7 shows the configuration of the detection device of FIG. 6.
Figure 8:
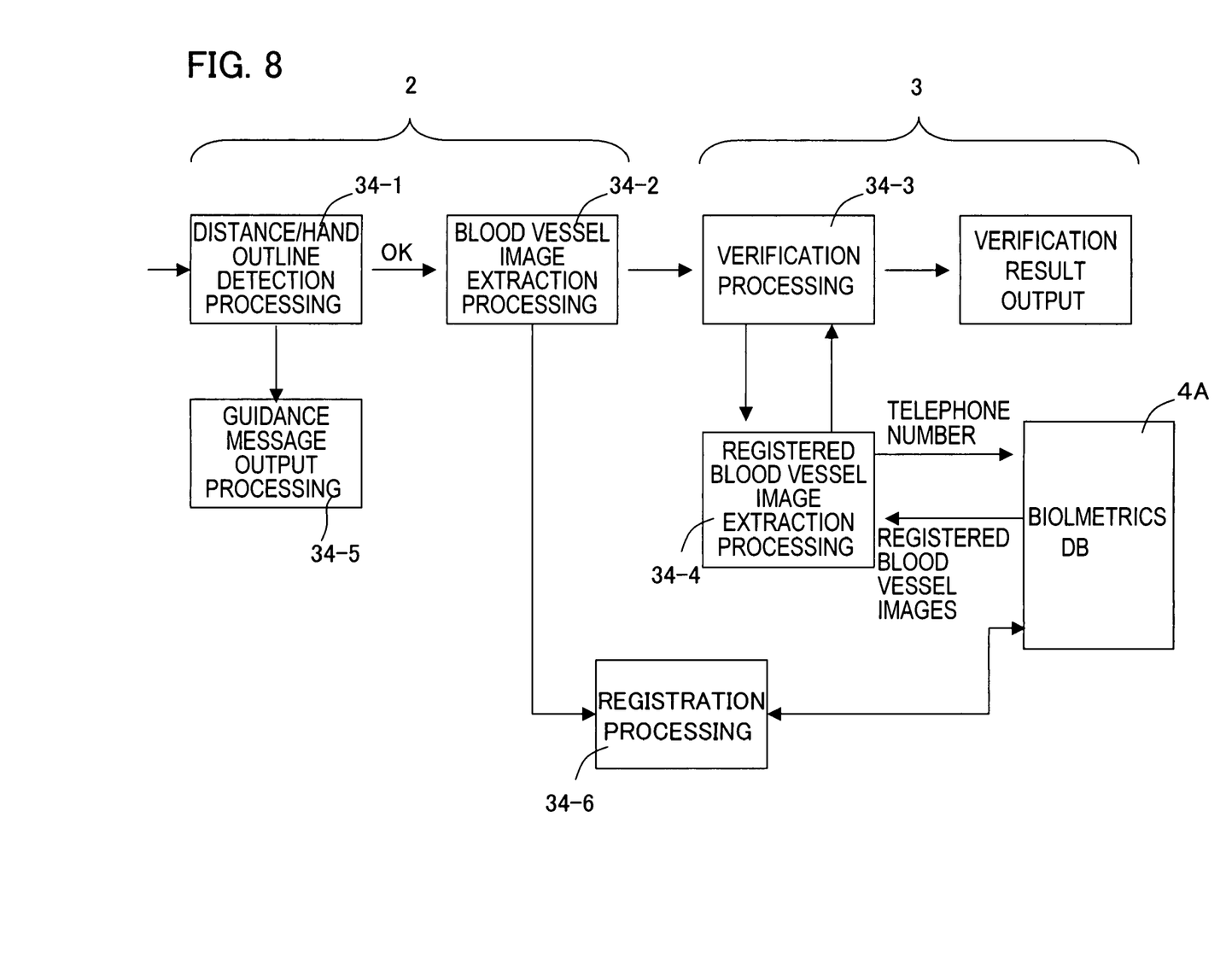
FIG. 8 is a block diagram of the biometrics authentication configuration in an embodiment of the invention.

Next, the biometrics authentication equipment of FIG. 1 and FIG. 2 is explained. FIG. 5 shows the system configuration of an embodiment of the invention; FIG. 6 is an external view of the palm image capture device in FIG. 5; FIG. 7 shows the configuration of the palm image capture device of FIG. 6; and FIG. 8 is a block diagram of biometrics authentication processing in an embodiment of the invention.

As shown in FIG. 5, a service application 30 and vein authentication library (program) 34 are installed on the server 3. A vein authentication library (program) 34 is also installed on the terminal device 2. The terminal device 2 is connected to a vein sensor (palm image capture device) 1, numeric keypad 90, card reader 9, and antenna 6.

As shown in FIG. 6, the palm image capture device 1 of FIG. 1, FIG. 2 and FIG. 5 is mounted a sensor unit 18 substantially in the center of the main unit 10 of the palm image capture device 1. On the forward portion (on the user side) of the sensor unit 18 is provided a front guide 14; on the ear portion is provided a rear guide 19. The front guide 14 comprises a sheet of synthetic resin, transparent or substantially transparent. The front guide 14 serves the purposes of guiding the hand of the user in the front and of supporting the wrist.

Hence as shown in FIG. 7, the front guide 14 guides and supports the wrist of the user so that the wrist is guided above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 services the purpose of supporting the fingers of the hand.

As shown in FIG. 7, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V. When the hand 72 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 7, by having the front guide 14 support the wrist 52 above the sensor unit 18, the user's hand can be guided and supported such that the position, inclination and height of the palm above the sensor unit 18 are made precise with respect to the image capture range of the sensor unit 18.

Next, the vein authentication library 34 is explained using FIG. 8. The vein authentication library 34 executes the series of registration and verification processing 34-1 to 34-6. The CPUs of the terminal 2 and server 3 execute the series of registration and verification processing 34-1 to 34-6.

Distance/hand outline detection processing 34-1 receives the distance measured by the distance sensor 15 of the image capture device 1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 34-5 outputs to the display of the service area terminal device 2 a message guiding the palm to the left or right, forward or backward, upward or downward, when the distance measured by the distance sensor 15 or the position of the hand according to the hand outline extraction indicates that the hand is outside the image capture range, or when the image cannot be used in registration and verification processing. By this means, the hand of the user is guided into position over the image capture device 1.

Blood vessel image extraction processing 34-2 extracts a vein image from the image of the hand when hand outline detection processing 34-1 judges that an image has been captured with the hand held correctly. That is, grayscale data of the image of the palm is obtained through differences in reflectivity, and from this blood vessel image (grayscale) data, predetermined blood vessel image characteristics (the directions of blood vessel trunks and branches, numbers of blood vessels, and similar) are extracted.

In the registered blood vessel image search processing 34-4, the registered blood vessel image data sets A, B, C (in FIG. 3, the biometrics data sets 05, 07, 28) and ID codes (in FIG. 3, 0005, 0007, 0028) corresponding to the input telephone number (in FIG. 3, 123-1234) are retrieved from the biometrics database file 4A shown in FIG. 1, FIG. 3, and FIG. 5. The verification processing 34-3 compares the blood vessel image data N1 detected in the blood vessel image detection processing 34-2 with the registered blood vessel image data sets A, B and C to perform verification processing, and outputs a verification result.

The registration processing 34-6 extracts characteristic data of the blood image from the detected blood vessel image data, and stores the characteristic data, together with the ID code, in a field of the corresponding telephone number in the biometrics database file 4A.

In the example of FIG. 5, the distance/hand outline detection processing 34-1, blood vessel image extraction processing 34-2, and guidance message output processing 34-5 are executed by the terminal 2, and the verification processing 34-3, registered blood vessel image extraction processing 34-4, and registration processing 34-6 are executed by the server 3.

Biometrics Data Registration Processing

Figure 9:
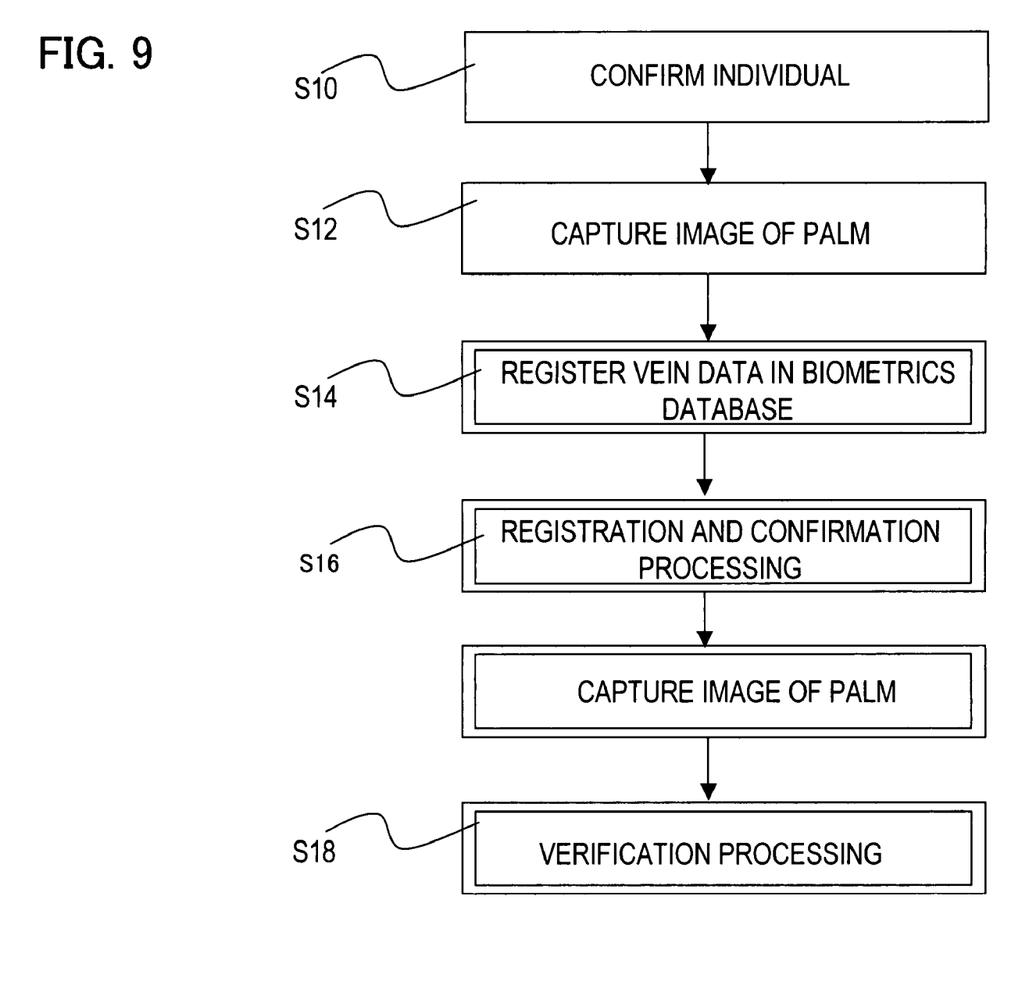
FIG. 9 shows the flow of biometrics characteristic data registration processing in FIG. 8.

Next, FIG. 9 is used to explain biometrics data registration processing of FIG. 1 and FIG. 2. FIG. 9 shows the flow of biometrics characteristic data registration processing. This registration processing is explained as being performed at the service area 2 and server 3 in FIG. 1 and FIG. 2, but can also be performed solely by the server 3.

(S10) First, the user is assumed to possess an individual card, on which is recorded an ID code. Upon using this individual card to apply for biometrics authentication, the user presents the card as well as a driver's license or other document to confirm his identity at the service area, and receives a confirmation of identity from the issuing source.

(S12) Upon receiving confirmation of identity, the user inserts his card 5 into the card reader 9, shown in FIG. 1, FIG. 2 and FIG. 5. When the user inserts the card 5, the ID code of the card 5 is read. The user holds a hand over the image capture device 1, whereupon the authentication library 34 of the terminal 2 in FIG. 5 executes the image capture processing 34-1, 34-2, 34-5 explained in FIG. 8, and obtains biometrics characteristic data (characteristic data of a blood vessel image). The image capture processing explained in FIG. 8 is again executed, and biometrics characteristic data is again obtained. The authentication library 34 verifies the two biometrics characteristic data sets and performs authentication for confirmation.

(S14) If the authentication result is OK, then the terminal 2 transmits a registration command, the telephone number, the ID code, and the biometrics data to the server 3 over the network 7. Upon reception, the server 3 writes the telephone number, ID code, and biometrics data to the biometrics database file 4A of FIG. 3.

(S16) Next, registration confirmation processing is begun. That is, a trial authentication is performed. To this end, the user again extends his hand over the image capture device 1, and an image of the palm of the hand is captured.

(S18) Similarly to the preceding description, the terminal 2 transmits a registration confirmation command and the biometrics data to the server 3 over the network 7. Upon reception, the server 3 performs verification using the authentication process described below using FIG. 10. Based on the result, the registered biometrics data is or is not confirmed as being valid for authentication.

In this way, a telephone number, ID code, and biometrics data are stored at the time of registration. In addition, a trial authentication is performed, so that the validity of the registered blood vessel image data can be confirmed. Upon completion of registration, the authentication library 34 automatically deletes the data, so that confidentiality can be enhanced.

Individual Information Access Processing Using Biometrics Data Authentication

Figure 10:
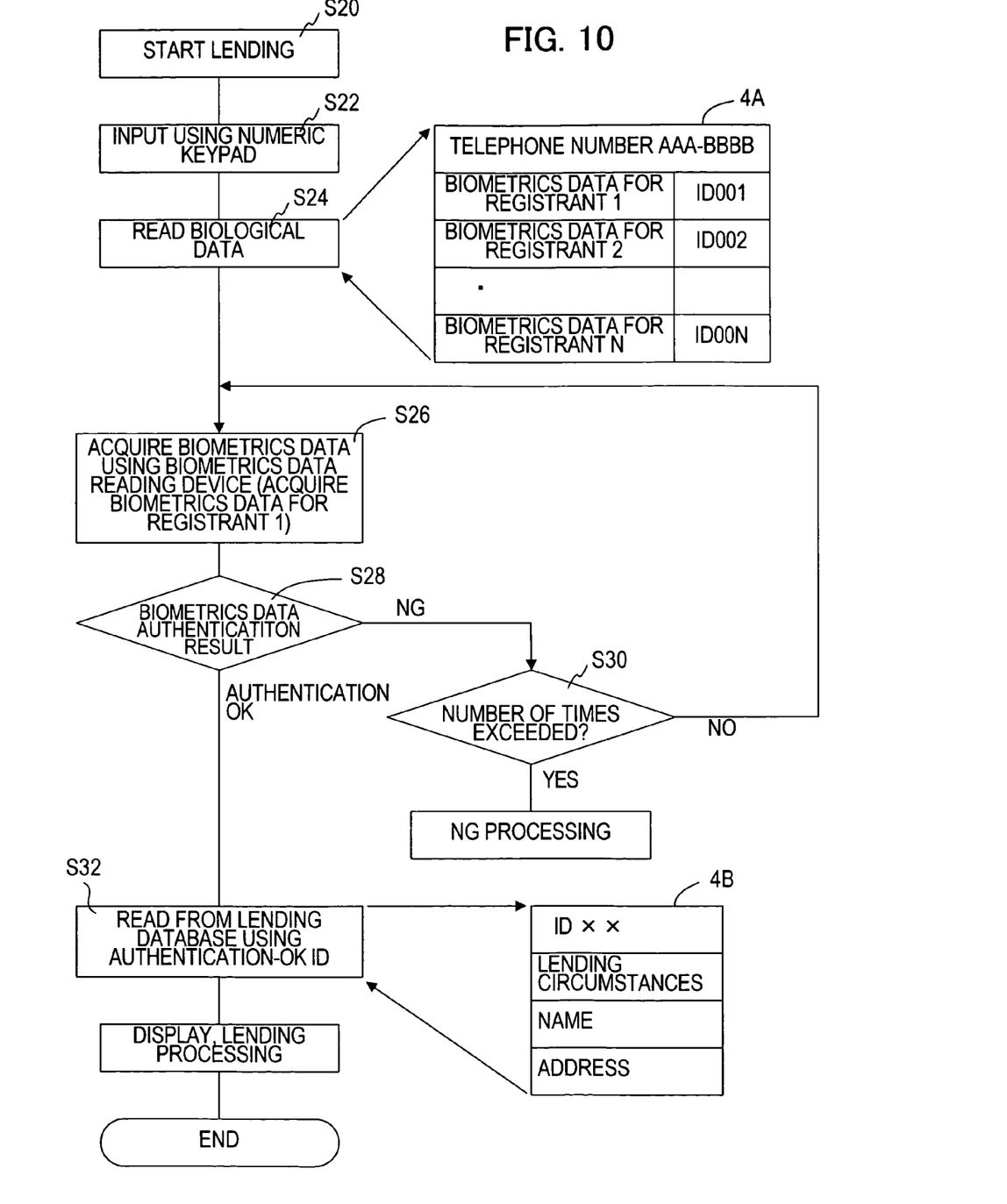
FIG. 10 shows the flow of information processing based on biometrics authentication in an embodiment of the invention; and, FIG. 11 shows the configuration of the service area equipment in another embodiment of the invention.

Next, the individual data access processing using biometrics authentication of FIG. 1 and FIG. 2 is explained using FIG. 10. FIG. 10 shows the flow of individual data access processing, including biometrics authentication processing.

(S20) At the service area, the user applies to borrow a book.

(S22) The user inputs a group number (here, a telephone number) using the numeric keypad 90. The terminal 2 transmits the input group number to the server 3 over the network 7.

(S24) The server 3 uses the group number to search the biometrics database file 4A of FIG. 3, and reads the corresponding ID code and biometrics data. When a plurality of ID codes and biometrics data sets are stored for this group number, the plurality of ID codes and biometrics data sets are read.

(S26) At the service area, an operator prompts the user to extend a hand, and the user extends the palm of a hand over the image capture device 1. The terminal 2 executes the image capture processing 34-1, 34-2, 34-5 explained in FIG. 8, acquires biometrics characteristic data, and transmits the data to the server 3.

(S28) The server 3 verifies the read-out registered biometrics data against the biometrics characteristic data obtained through image capture, and performs authentication. This authentication processing calculates the degree of similarity between numerous characteristic data items (that is, characteristic point data) of two blood vessel images, and when the degree of similarity between two characteristic points is high, judges the verification to be satisfactory. For example, in general perfect agreement is rare, so that when a threshold of at least a certain similarity is set, and the number of occurrences in which the similarity is equal to or greater than the threshold is much greater than the number below the threshold, the two blood vessel image data sets may be judged to be the same. When there are a plurality of biometrics data sets, authentication processing is first performed in order of ID code, for example, or in the order of highest priority assigned according to frequency of use, and if there is no match, authentication is performed for the next biometrics data set; if the authentication processing result is not satisfactory for the plurality of biometrics data sets, processing proceeds to step S30.

(S30) If the authentication result in step S28 is unsatisfactory (NG), a judgment is made as to whether the number of NG results is within a prescribed number. If the number of NG results exceeds the prescribed number, an instruction is issued for NG processing; for example, the server 3 issues an instruction to the terminal 2 to have the service area operator handle the matter. If on the other hand the number of NG results does not exceed the prescribed number, processing returns to step S26.

(S32) If on the other hand step S28 yields an authentication OK result, the server 3 uses the ID code of the person for whom the biometrics authentication has succeeded to search the lending database file 4B of FIG. 4, and reads out the corresponding individual information (here, the lending circumstances, name, address, and similar). The server 3 transmits the read-out individual information to the terminal 2. The terminal 2 displays this individual data on a display, and the operator confirms the data. Through operation by the operator and management data for the book read by the antenna 6, lending processing is performed, the server 3 is notified of the result, and the lending database file 4B is updated. Lending processing then ends.

OTHER EMBODIMENTS

Figure 11:
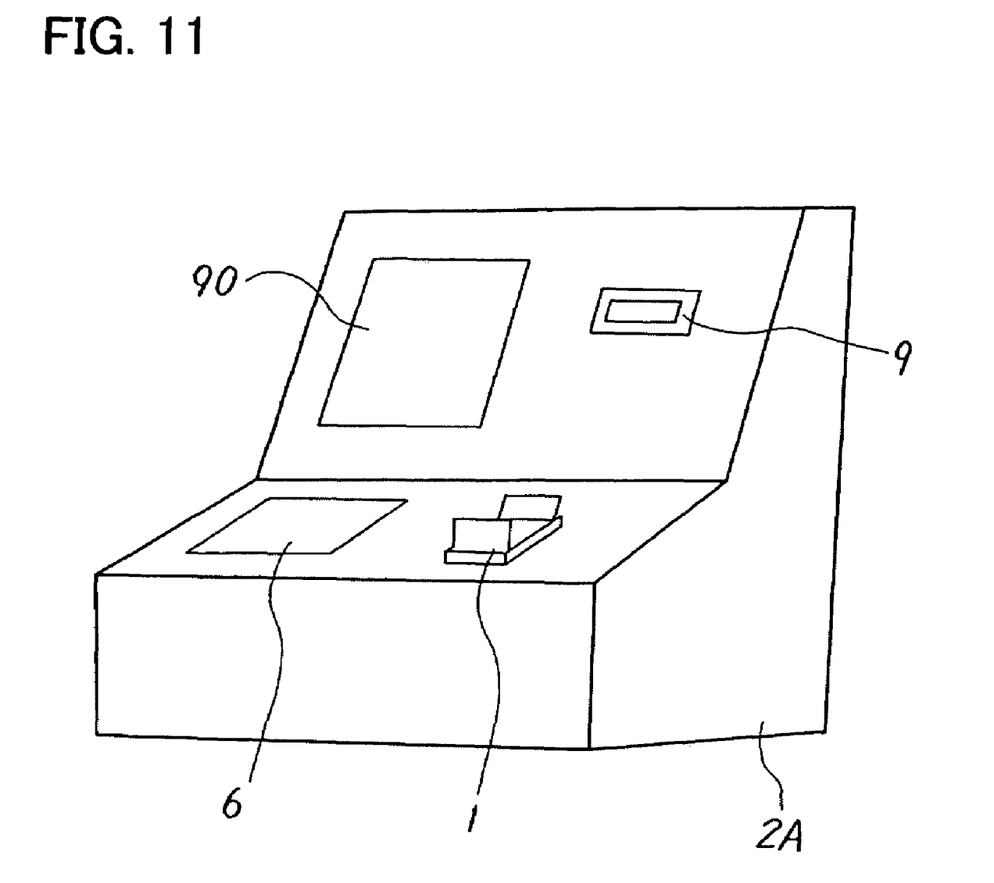

FIG. 11 is the configuration of the terminal device of another embodiment of the invention, showing an automated lending apparatus. The automated lending apparatus 2A has an antenna 6, image capture device 1, touch-screen 90, and card reader 9. An image of a numeric keypad is displayed on the touch-screen 90, serving the purpose of the numeric keypad in FIG. 1 and FIG. 2. The touch-screen 90 displays guidance messages and the screens displayed on the terminal 2 in FIG. 1 and FIG. 2. And registration, authentication, and lending processing are performed as a result of operation by a user.

In the above-described embodiment, a telephone number was used as the group number; but department codes in a company, birth dates, or other group numbers can be used. Further, in the above embodiment the biometrics authentication processing of FIG. 8 was executed by the terminal 2 and server 3; but processing may be executed by the terminal 2 alone, or by the server 3 alone.

Moreover, the field of application is not limited to processing of book loans, and application to video, auto and other rental systems, to uses in place of credit cards in finance and distribution fields, to reservation examination systems for railway, aircraft, and other transportation systems, and to systems to manage ingress and egress for buildings where secrecy is required. Moreover, an explanation was given for the case of authentication using the vein pattern of the palm of a hand; but application to the vein patterns in the back of a hand or in the fingers, or authentication of the characteristics of other blood vessel images, as well as to fingerprints, handprints, characteristics of the eyes, and similar, is also possible.

In the above, this invention has been explained through embodiments; but various modifications may be made within the scope of the invention, and these modifications are not excluded from the scope of the invention.

A biometrics database which links and stores group numbers, individual identification numbers, and biometrics data is provided, and biometrics data for a group is read using a group number and is verified against detected biometrics data to identify an individual identification number, so that accessing of an individual database is possible even when a group number is input. Consequently even if a user sets a group number not easily forgotten, accurate individual authentication can be executed through biometrics authentication, and moreover individual information can be accessed securely, contributing to improved convenience for users.

What is claimed is:

1. An information processing system using biometrics authentication for individual authentication and accessing of information relating to the individual of said individual authentication is permitted, comprising:

a detection device, which detects the relevant portion of said biometrics characteristics;

an input unit, which inputs a group number of said user;

a biometrics database file, which stores said group number, a plurality of individual identification numbers belonging to the group of the group number, and biometrics characteristic data linked to said individual identification numbers;

an individual database file, which stores individual information for said user linked to said individual identification numbers; and a control unit which reads the corresponding individual identification numbers and said biometrics characteristic data from said biometrics database file according to input said group number, and performs processing to verify said biometrics characteristic data obtained from said biometrics characteristic portion detected by said detection device against said read-out biometrics characteristic data;

wherein said control unit executes access of said individual database file using said individual identification number linked to said biometrics characteristic data for which the result of said verification is satisfactory.

2. The information processing system using biometrics authentication according to claim 1, wherein said control unit comprises:

a terminal device connected to said detection device and to said input unit; and server connected to said biometrics database file and to said individual database file, and wherein said terminal device and said server are connected.

3. The information processing system using biometrics authentication according to claim 2, wherein said terminal device transmits said input group number and biometrics characteristic data detected by said detection device to said server, and wherein said server reads from said biometrics database file the corresponding individual identification numbers and said biometrics characteristic data using said input group number, performs verification processing against said biometrics characteristic data detected by said detection device, uses said individual identification number linked to said biometrics characteristic data for which said verification result is satisfactory to execute access of said individual database file, and transmits said accessed individual information to said terminal device.

4. The information processing system using biometrics authentication according to claim 2, wherein said terminal device transmits said input group number to said server, and wherein said server uses said input group number to read and transmit to said terminal device the corresponding individual identification numbers and said biometrics characteristic data from said biometrics database file, and said terminal device performs verification processing against said biometrics characteristic data detected by said detection device and notifies said server of said verification result, and said server uses said individual identification number linked to said biometrics characteristic data for which said verification result is satisfactory to execute access of said individual database file and transmit said accessed individual information to said terminal device.

5. The information processing system using biometrics authentication according to claim 1, wherein said control unit receives the group number input from said input unit, the individual identification number and the biometrics characteristic data detected by said detection device, and registers said group number, said individual identification number, and said biometrics characteristic data in said biometrics database file.

6. The information processing system using biometrics authentication according to claim 1, wherein said control unit uses said input group number to perform processing to verify a plurality of sets of said biometrics characteristic data which are read from said biometrics database file, against said biometrics characteristic data obtained from said biometrics characteristic portion detected by said detection device, and identifies the individual identification number belonging to said group.

7. The information processing system using biometrics authentication according to claim 1, wherein said control unit extracts said biometrics characteristic data from said biometrics characteristic portion detected by said detection device.

8. The information processing system using biometrics authentication according to claim 1, wherein said detection device comprises a device which detects blood vessel images in the body.

9. The information processing system using biometrics authentication according to claim 8, wherein said detection device comprises an image capture unit which captures images of blood vessels in a hand of said body.

10. The information processing system using biometrics authentication according to claim 1, wherein said control unit uses said accessed individual information to execute processing of individual information.

* * * * *